US008590411B2

(12) United States Patent
Lee

(10) Patent No.: US 8,590,411 B2
(45) Date of Patent: Nov. 26, 2013

(54) AUTOMATIC MANUAL TRANSMISSION

(75) Inventor: Yeon-Tae Lee, Gyeonggi-do (KR)

(73) Assignee: Hyundai Powertech Co., Ltd, Seosan-Si, Chungcheongnam-Do (KR)

( * ) Notice: Subject to any disclaimer, the term of this patent is extended or adjusted under 35 U.S.C. 154(b) by 169 days.

(21) Appl. No.: 13/252,453

(22) Filed: Oct. 4, 2011

(65) Prior Publication Data

US 2013/0008285 A1      Jan. 10, 2013

(30) Foreign Application Priority Data

Jul. 8, 2011   (KR) ................. 10-2011-0067834

(51) Int. Cl.
*F16H 3/08*   (2006.01)

(52) U.S. Cl.
USPC .......................................................... 74/330

(58) Field of Classification Search
USPC .................................... 74/330, 331, 333, 340
See application file for complete search history.

(56) References Cited

U.S. PATENT DOCUMENTS

| | | | |
|---|---|---|---|
| 7,832,299 B2 * | 11/2010 | Kobayashi et al. .......... | 74/330 |
| 2003/0121343 A1 * | 7/2003 | Berger et al. .................. | 74/340 |
| 2006/0219033 A1 * | 10/2006 | Gitt ................................ | 74/330 |
| 2007/0107542 A1 | 5/2007 | Gumpoltsberger | |
| 2007/0214906 A1 | 9/2007 | Fahland et al. | |
| 2007/0227282 A1 | 10/2007 | Forsyth | |
| 2007/0259748 A1 | 11/2007 | Forsyth | |
| 2007/0266810 A1 * | 11/2007 | Forsyth ......................... | 74/331 |
| 2008/0196543 A1 * | 8/2008 | Kobayashi et al. ........... | 74/664 |
| 2010/0037718 A1 | 2/2010 | Gumpoltsberger | |
| 2010/0154573 A1 | 6/2010 | Jackson et al. | |
| 2010/0242646 A1 | 9/2010 | Gumpoltsberger et al. | |
| 2010/0282019 A1 | 11/2010 | Rieger | |

\* cited by examiner

*Primary Examiner* — Ha D Ho
(74) *Attorney, Agent, or Firm* — Bacon & Thomas, PLLC

(57) ABSTRACT

An automated manual transmission includes first and second power input shafts, a drive gear part, a clutch arranged to transmit or interrupt the power of the engine to the first or second input shaft, first and second power output shafts to which power is transmitted from the first or second input shaft, driven gearing including a plurality of driven gears on the first and second output shafts, and a synchronizer connecting or disconnecting the first output shaft or the second output shaft and the driven gear to provide multi-stage gear shift steps. The clutch includes first and second clutches installed at the first and second input shafts to transmit or interrupt input engine power. An example of such transmission having 8 forward speeds and one reverse speed is described.

5 Claims, 2 Drawing Sheets

Fig. 2

| | CLUTCH | | SYNCHRO. POSITION | | | | | | | |
|---|---|---|---|---|---|---|---|---|---|---|
| | C1 | C2 | I | II | III | IV | V | VI | VII | R |
| 1 | ○ | | ● | ● | | | | | | |
| 2 | | ○ | | ● | | | | | | |
| 3 | ○ | | | | ● | | | | | |
| 4 | | ○ | | | | ● | | | | |
| 5 | ○ | | | | | | ● | | | |
| 6 | | ○ | | | | | | ● | | |
| 7 | ○ | | | | | | | ● | ● | |
| 8 | | ○ | ● | | | | ● | | | |
| R | ○ | | ● | | | | | | | ● |

AUTOMATIC MANUAL TRANSMISSION

CROSS-REFERENCE TO RELATED APPLICATION

This application claims priority to and the benefit of Korean Patent Application No. 2011-0067834, filed Jul. 8, 2011, the disclosure of which is incorporated herein by reference in its entirety.

BACKGROUND

1. Field of the Invention

The present invention relates to an automated manual transmission, and more particularly, to an automated manual transmission capable of realizing multi-stage gear shift steps of six or more forward speeds and one or more rearward speeds.

2. Discussion of Related Art

An automated manual transmission, which is capable of realizing advantages of a manual transmission and an automatic transmission, has advantages of convenience of operation while driving, smooth acceleration and high driving stability.

The automated manual transmission is provided with a hydraulic or electronic control system to realize automatic gear shift of a mechanical transmission.

During the gear shift performed by the hydraulic or electronic control system, since a rotational force of an engine cannot be transmitted to a transmission by an operation of a clutch, transmission of power is interrupted.

After completion of the gear shift of the transmission, the rotational force of the engine is transmitted to the transmission by the operation of the clutch, and the rotational force of the engine is increase or decreased depending on a converted gear ratio to be transmitted to a driving wheel.

The above technical configuration has been described as the background art for illustrative purposes only to help understand the present invention, and is not presented as related art that is well known in the art to which the present invention relates.

SUMMARY OF THE INVENTION

Since a conventional automated manual transmission includes a plurality of gears installed between an input shaft and an output shaft and a synchronization device configured to selectively connect an input shaft-side gear and an output shaft-side gear, it is difficult to increase the number of gear steps that can be realized by the automated manual transmission.

Therefore, necessity of improvement thereof is needed.

In order to solve the problems, it is an object of the present invention to provide an automated manual transmission capable of realizing multi-stage gear shift steps of six or more forward speeds and one or more rearward speeds.

In order to accomplish the object, the present invention provides an automated manual transmission including: a first input shaft to which power of an engine is transmitted; a second input shaft to which the power of the engine is transmitted; a drive gear part installed at the first input shaft and the second input shaft; a clutch part configured to transmit or interrupt the power of the engine to the first input shaft or the second input shaft; a first output shaft to which the power is transmitted from the first input shaft or the second input shaft; a second output shaft, to which the power is transmitted from the first input shaft or the second input shaft, including a plurality of shafts disposed on the same axis; a driven gear part constituted by a plurality of driven gears installed at the first output shaft and the second output shaft; and a synchronization part configured to connect or disconnect the first output shaft or the second output shaft and the driven gear part to realize multistage gear shift steps, wherein the clutch part includes: a first clutch installed at the first input shaft and configured to transmit or interrupt the power of the engine; and a second clutch installed at the second input shaft and configured to transmit or interrupt the power of the engine.

In addition, the drive gear part may include: a first drive gear installed at the first input shaft and configured to transmit the power; a second drive gear installed at the first input shaft and configured to transmit the power; a third drive gear installed at the second input shaft and configured to transmit the power; and a fourth drive gear installed at the second input shaft and configured to transmit the power, wherein the first drive gear, the second drive gear, the third drive gear and the fourth drive gear are meshed with the driven gear part to constitute four gear arrays.

Further, the driven gear part may include: a first driven gear rotatably connected to the second output shaft and meshed with the first drive gear; a second driven gear rotatably connected to the first output shaft and meshed with the first drive gear; a third driven gear rotatably connected to the first output shaft and meshed with the second drive gear; a fourth driven gear rotatably connected to the first output shaft and meshed with the third drive gear; a fifth driven gear connected to the second output shaft and meshed with the third drive gear; a sixth driven gear rotatably connected to the first output shaft; a seventh driven gear rotatably connected to the second output shaft and meshed with the fourth drive gear and the sixth driven gear; and an eighth driven gear rotatably connected to the second output shaft and meshed with the second drive gear.

Furthermore, the second output shaft may include: a front output shaft provided with the seventh driven gear; and a rear output shaft provided with the first driven gear, the fifth driven gear and the eighth driven gear.

In addition, the synchronization part may include: a first synchronizer slidably installed at the first output shaft and engaged with or separated from the fourth driven gear or the sixth driven gear; a second synchronizer slidably installed at the first output shaft and engaged with or separated from the second driven gear or the third driven gear; a third synchronizer slidably installed at the second output shaft, engaged with or separated from the fifth driven gear or the seventh driven gear, and installed at the front output shaft; and a fourth synchronizer slidably installed at the second output shaft, engaged with or separated from the first driven gear, engaged with or separated from the eighth driven gear, and installed at the rear output shaft.

Further, a first transmission gear meshed with a differential gear may be installed at the first output shaft, and a second transmission gear meshed with the differential gear may be installed at the front output shaft.

Furthermore, in the automated manual transmission, the first clutch may be operated, the fourth synchronizer may be engaged with the first driven gear, and the third synchronizer may be engaged with the seventh driven gear to realize a gear shift step of a first forward speed; the second clutch may be operated, and the third synchronizer may be engaged with the seventh driven gear to realize a gear shift step of a second forward speed; the first clutch may be operated, and the second synchronizer may be engaged with the second driven gear to realize a gear shift step of a third forward speed; the second clutch may be operated, and the first synchronizer may be engaged with the fourth driven gear to realize a gear shift step of a fourth forward speed; the first clutch may be operated, and the second synchronizer may be engaged with the third driven gear to realize a gear shift step of a fifth forward speed; the second clutch may be operated, and the third synchronizer may be engaged with the fifth driven gear to realize a gear shift step of a sixth forward speed; the first clutch may be operated, the third synchronizer may be engaged with the fifth driven gear, and the fourth synchronizer may be connected to the eighth driven gear to realize a gear shift step of a seventh forward speed; the second clutch may be operated, the fourth synchronizer may be engaged with the first driven gear, and the second synchronizer may be connected to the third driven gear to realize a gear shift step of an eighth forward speed; and the first clutch may be operated, the fourth synchronizer may be engaged with the first driven gear, and the first synchronizer may be engaged with the sixth driven gear to realize a gear shift step of one rearward speed.

BRIEF DESCRIPTION OF THE DRAWINGS

The above and other objects, features and advantages of the present invention will become more apparent to those of ordinary skill in the art by describing in detail example embodiments thereof with reference to the attached drawings, in which:

FIG. 2 is a table representing operation elements of a clutch and a synchronization part of the automated manual transmission in accordance with the exemplary embodiment of the present invention.

DETAILED DESCRIPTION OF EXAMPLE EMBODIMENTS

Figure 1:
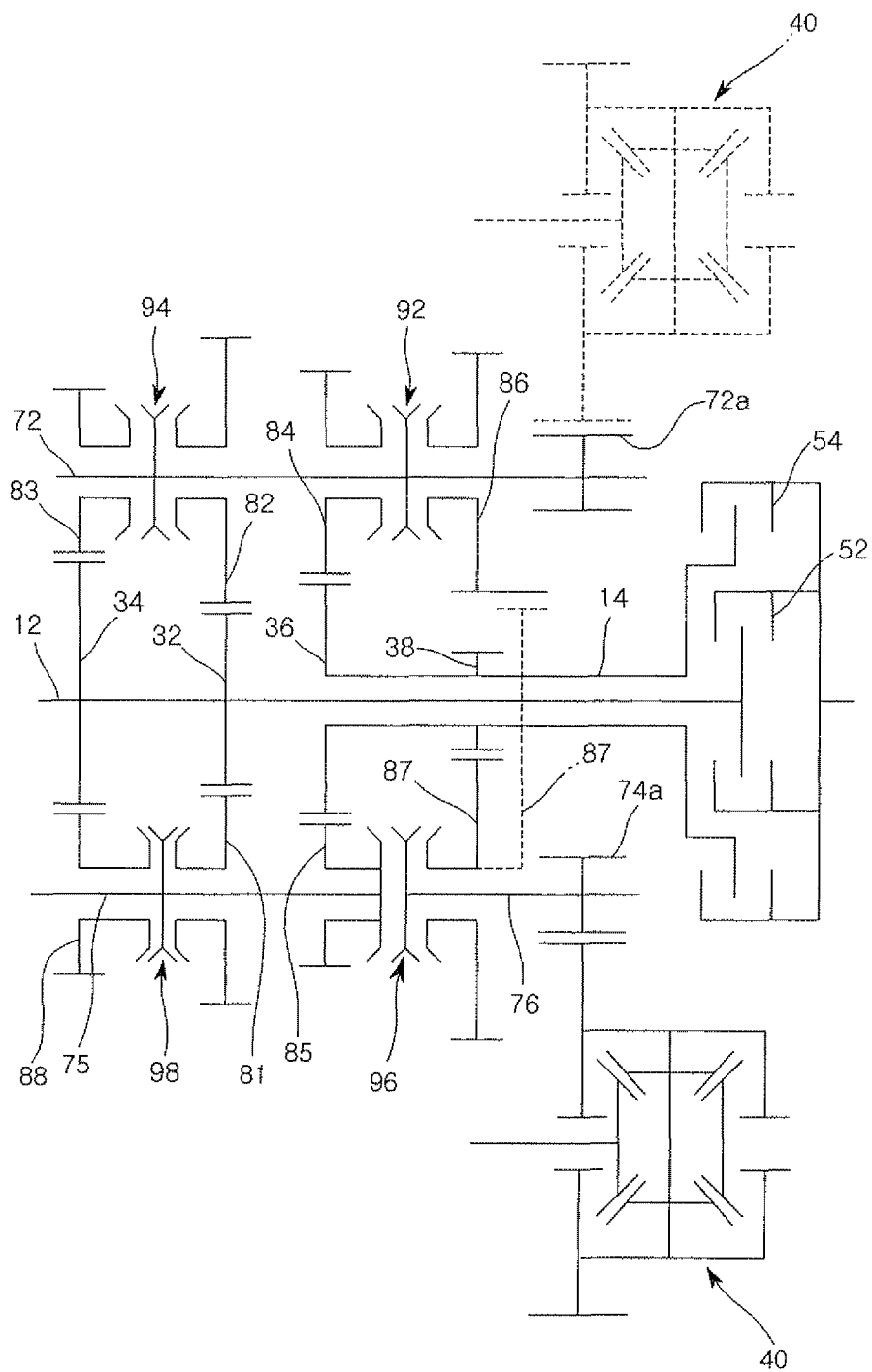
FIG. 1 is a schematic view showing an automated manual transmission in accordance with an exemplary embodiment of the present invention.

Hereinafter, an example embodiment of an automated manual transmission in accordance with the present invention will be described in detail with reference to the accompanying drawings.

Here, thicknesses of lines shown in the drawings and sizes of components may be exaggerated for clarity and convenience of description.

In addition, terms that are to be defined in consideration of functions in the present invention, may be differentiated according to intentions or practices of a user or an operator.

Accordingly, definitions of these terms should be defined based on descriptions throughout the specification.

FIG. 1 is a schematic view showing an automated manual transmission in accordance with an exemplary embodiment of the present invention, and FIG. 2 is a table representing operation elements of a clutch and a synchronization part of the automated manual transmission in accordance with the exemplary embodiment of the present invention.

Referring to FIGS. 1 and 2, the automated manual transmission in accordance with the exemplary embodiment of the present invention includes a first input shaft 12 to which power of an engine is transmitted, a second input shaft 14 to which the power of the engine is transmitted, main drive gear parts 32, 34, 36 and 38 installed at the first input shaft 12 and the second input shaft 14, clutch parts 52 and 54 configured to transmit or interrupt the power of the engine to the first input shaft 12 or the second input shaft 14, a first output shaft 72 to which the power is transmitted from the first input shaft 12 or the second input shaft 14, second output shafts 75 and 76, to which the power is transmitted from the first input shaft 12 or the second input shaft 14, including a plurality of shafts disposed on the same axis, driven gear parts 81, 82, 83, 84, 85, 86, 87 and 88 installed at the first output shaft 72 and the second output shafts 75 and 76, and synchronization parts 92, 94, 96 and 98 configured to connect or disconnect the first output shaft 72 or the second output shafts 75 and 76 to the driven gear parts 81, 82, 83, 84, 85, 86, 87 and 88 to realize gear shift steps of eight forward speeds and one rearward speed.

The power of the engine is transmitted to the first input shaft 12 or the second input shaft 14 by operations of the clutch parts 52 and 54, and the power of the engine is transmitted along the main drive gear parts 32, 34, 36 and 38 and the driven gear parts 81, 82, 83, 84, 85, 86, 87 and 88 by operations of the synchronization parts 92, 94, 96 and 98 to realize the gear shift steps of eight forward speeds and one rearward speed.

The clutch parts 52 and 54 include a first clutch 52 installed at the first input shaft 12 and configured to transmit or interrupt the power of the engine, and a second clutch 54 installed at the second input shaft 14 and configured to transmit or interrupt the power of the engine.

The first clutch 52 and the second clutch 54 are selectively operated according to an operation signal transmitted from a control unit. When the first clutch 52 is operated, the power of the engine is transmitted to the first input shaft 12, and when the second clutch 54 is operated, the power of the engine is transmitted to the second input shaft 14.

The drive gear parts 32, 34, 36 and 38 include a first drive gear 32 installed at the first input shaft 12 and configured to transmit power of a first forward speed or a third forward speed, a second drive gear 34 installed at the first input shaft 12 and configured to transmit power of a fifth forward speed or a seventh forward speed, a third drive gear 36 installed at the second input shaft 14 and configured to transmit power of a fourth forward speed or a sixth forward speed, and a fourth drive gear 38 installed at the second input shaft 14 and configured to transmit power of a second forward speed or one rearward speed.

When the first clutch 52 is operated, the power of the engine transmitted along the first input shaft 12 passes through the first drive gear 32 or the second drive gear 34 and then passes through the driven gear parts 81, 82, 83 and 88 to realize any one gear shift step of the first forward speed, the third forward speed, the fifth forward speed, the seventh forward speed and the eighth forward speed by operations of the synchronization parts 94 and 98.

When the second clutch 54 is operated, the power of the engine transmitted along the second input shaft 14 passes through the third drive gear 36 or the fourth drive gear 38 and then passes the driven gear parts 84, 85, 86 and 87 to realize any one gear shift step of the second forward speed, the fourth forward speed, the sixth forward speed, the eighth forward speed and one rearward speed by operations of the synchronization parts 92 and 96.

The driven gear parts 81, 82, 83, 84, 85, 86, 87 and 88 include a first driven gear 81 rotatably connected to a rear output shaft 75 of the second output shafts 75 and 76 and meshed with the first drive gear 32, a second driven gear 82 rotatably connected to the first output shaft 72 and meshed with the first drive gear 32, a third driven gear 83 rotatably connected to the first output shaft 72 and meshed with the second drive gear 34, a fourth driven gear 84 rotatably connected to the first output shaft 72 and meshed with the third drive gear 36, a fifth driven gear 85 connected to the rear output shaft 75 of the second output shafts 75 and 76 and meshed with the third drive gear 36, a sixth driven gear 86 rotatably connected to the first output shaft 72, a seventh driven gear 87 rotatably connected to a front output shaft 76 of the second output shafts 75 and 76 and meshed with the fourth drive gear 38 and the sixth driven gear 86, and an eighth driven gear 88 rotatably connected to the rear output shaft 75 of the second output shafts 75 and 76 and meshed with the second drive gear 34.

The synchronization parts 92, 94, 96 and 98 include a first synchronizer 92 slidably installed at the first output shaft 72 and engaged with or separated from the fourth driven gear 84 or the sixth driven gear 86, a second synchronizer 94 slidably installed at the first output shaft 72 and engaged with or separated from the second driven gear 82 or the third driven gear 83, a third synchronizer 96 slidably installed at the front output shaft 76 and engaged with or separated from the fifth driven gear 85 or the seventh driven gear 87, and a fourth synchronizer 98 slidably installed at the rear output shaft 75 and engaged with or separated from the first driven gear 81 or the eighth driven gear 88.

When the first synchronizer 92 is engaged with the fourth driven gear 84, the power of the engine transmitted from the third drive gear 36 is transmitted to the first output shaft 72 through the fourth driven gear 84, and when the first synchronizer 92 is engaged with the sixth driven gear 86, the power of the engine transmitted from the fourth drive gear 38 is transmitted to the first output shaft 72 through the sixth driven gear 86.

When the second synchronizer 94 is engaged with the second driven gear 82, the power of the engine transmitted from the first drive gear 32 is transmitted to the first output shaft 72 through the second driven gear 82, and when the second synchronizer 94 is engaged with the third driven gear 83, the power of the engine transmitted from the second drive gear 34 is transmitted to the first output shaft 72 through the third driven gear 83.

When the third synchronizer 96 is engaged with the fifth driven gear 85, the power of the engine transmitted from the third drive gear 36 is transmitted to the rear output shaft 75 through the fifth driven gear 85, and when the third synchronizer 96 is engaged with the seventh driven gear 87, the power of the engine transmitted from the fourth drive gear 38 is transmitted to the front output shaft 76 through the seventh driven gear 87.

When the fourth synchronizer 98 is engaged with the first driven gear 81, the power of the engine transmitted from the first drive gear 32 is transmitted to the rear output shaft 75 through the first driven gear 81, and when the fourth synchronizer 98 is engaged with the eighth driven gear 88, the power of the engine transmitted from the second drive gear 34 is transmitted to the rear output shaft 75 through the eighth driven gear 88.

Since a first transmission gear 72a meshed with a differential gear 40 is installed at the first output shaft 72, the power of the engine transmitted to the first output shaft 72 is transmitted to the differential gear 40 through the first transmission gear 72a.

The second output shafts 75 and 76 include the front output shaft 76 provided with a second transmission gear 74a meshed with the differential gear 40, the seventh driven gear 87 and the third synchronizer 96, and the rear output shaft 75 provided with the first driven gear 81, the fifth driven gear 85, the eighth driven gear 88 and the fourth synchronizer 98.

An operation of the automated manual transmission in accordance with the exemplary embodiment of the present invention configured as above will be described as follows.

When a vehicle is driven to realize the gear shift step of the first forward speed, the first clutch 52 is operated, the fourth synchronizer 98 is engaged with the first driven gear 81, and the third synchronizer 96 is engaged with the seventh driven gear 87.

Therefore, the power of the engine transmitted to the first input shaft 12 through the first clutch 52 is transmitted to the differential gear 40 via the first drive gear 32, the first driven gear 81, the rear output shaft 75, the fifth driven gear 85, the third drive gear 36, the fourth drive gear 38, the seventh driven gear 87, the front output shaft 76 and the second transmission gear 74a.

When the gear shift step of the second forward speed is realized, the second clutch 54 is operated, and the third synchronizer 96 is engaged with the seventh driven gear 87.

Accordingly, the power of the engine transmitted to the second input shaft 14 through the second clutch 54 is transmitted to the differential gear 40 via the fourth drive gear 38, the seventh driven gear 87, the front output shaft 76 and the second transmission gear 74a.

When the gear shift step of the third forward speed is realized, the first clutch 52 is operated, and the second synchronizer 94 is engaged with the second driven gear 82.

Accordingly, the power of the engine transmitted to the first input shaft 12 through the first clutch 52 is transmitted to the differential gear 40 via the first drive gear 32, the second driven gear 82, the first output shaft 72 and the first transmission gear 72a.

When the gear shift step of the fourth forward speed is realized, the second clutch 54 is operated, and the first synchronizer 92 is engaged with the fourth driven gear 84.

Accordingly, the power of the engine transmitted to the second input shaft 14 through the second clutch 54 is transmitted to the differential gear 40 via the third drive gear 36, the fourth driven gear 84, the first output shaft 72 and the first transmission gear 72a.

When the gear shift step of the fifth forward speed is realized, the first clutch 52 is operated, and the second synchronizer 94 is engaged with the third driven gear 83.

Accordingly, the power of the engine transmitted to the first input shaft 12 through the first clutch 52 is transmitted to the differential gear 40 via the second drive gear 34, the third driven gear 83, the first output shaft 72 and the first transmission gear 72a.

When the gear shift step of the sixth forward speed is realized, the second clutch 54 is operated, and the third synchronizer 96 is engaged with the fifth driven gear 85.

Accordingly, the power of the engine transmitted to the second input shaft 14 through the second clutch 54 is transmitted to the differential gear 40 via the third drive gear 36, the fifth driven gear 85, the front output shaft 76 and the second transmission gear 74a.

When the gear shift step of the seventh forward speed is realized, the first clutch 52 is operated, the third synchronizer 96 is engaged with the fifth driven gear 85, and the fourth synchronizer 98 is connected to the eighth driven gear 88.

Accordingly, the power of the engine transmitted to the first input shaft 12 through the first clutch 52 is transmitted to the differential gear 40 via the second drive gear 34, the eighth driven gear 88, the rear output shaft 75, the fifth driven gear 85, the fourth drive gear 38, the seventh driven gear 87, the sixth driven gear 86, the first output shaft 72 and the first transmission gear 72a to realize the gear shift step of the seventh forward speed.

When the gear shift step of the eighth forward speed is realized, the second clutch 54 is operated, the fourth synchronizer 98 is engaged with the first driven gear 81, and the second synchronizer 94 is connected to the third driven gear 83.

Accordingly, the power of the engine transmitted to the second input shaft 14 via the second clutch 54 is transmitted to the differential gear 40 along the third drive gear 36, the firth driven gear 85, the rear output shaft 75, the first driven gear 81, the first drive gear 32, the first input shaft 12, the second drive gear 34, the third driven gear 83, the first output shaft 72 and the first transmission gear 72a to realize the gear shift step of the eighth forward speed.

When the gear shift step of the one rearward speed is realized, the first clutch 52 is operated, the fourth synchronizer 98 is engaged with the first driven gear 81, and the first synchronizer 92 is engaged with the sixth driven gear 86.

Accordingly, the power of the engine transmitted to the first input shaft 12 through the first clutch 52 is transmitted to the differential gear 40 via the first drive gear 32, the first driven gear 81, the rear output shaft 75, the fifth driven gear 85, the third drive gear 36, the second input shaft 14, the fourth drive gear 38, the seventh driven gear 87, the sixth driven gear 86, the first output shaft 72 and the first transmission gear 72a.

As a result, it is possible to provide the automated manual transmission capable of realizing the gear shift steps of the eight forward speeds and the one rearward speed.

While the present invention has been described with reference to the embodiment shown in the drawings for the illustrative purpose only, it will be apparent to an ordinary skill in the art that various modifications and equivalent other embodiments can be made without departing from the spirit of the present invention.

In addition, while the automated manual transmission for a vehicle has been exemplarily described for illustrative purposes only, the automated manual transmission of the present invention may be used in other products in addition to the vehicle.

As can be seen from the foregoing, since an automated manual transmission in accordance with the present invention includes four gear trains and four synchronization parts to realize gear shift steps of eight forward speeds and one rearward speed, a multi-stage gear shift can be realized while reducing the size and weight of a transmission.

While the invention has been shown and described with reference to a certain example embodiment thereof, it will be understood by those skilled in the art that various changes in form and details may be made therein without departing from the spirit and scope of the invention as defined by the appended claims.

What is claimed is:

1. An automated manual transmission comprising:
   a first input shaft to which power of an engine is transmitted;
   a second input shaft to which the power of the engine is transmitted;
   a drive gear part installed at the first input shaft and the second input shaft, the drive gear part including
   a first drive gear installed at the first input shaft and configured to transmit the power;
   a second drive gear installed at the first input shaft and configured to transmit the power;
   a third drive gear installed at the second input shaft and configured to transmit the power; and
   a fourth drive gear installed at the second input shaft and configured to transmit the power,
   wherein the first drive gear, the second drive gear, the third drive gear and the fourth drive gear are meshed with the driven gear part to constitute four gear arrays;
   a clutch part configured to transmit or interrupt the power of the engine to the first input shaft or the second input shaft;
   a first output shaft to which the power is transmitted from the first input shaft or the second input shaft;
   a second output shaft, to which the power is transmitted from the first input shaft or the second input shaft, including a plurality of shafts disposed on the same axis;
   a driven gear part constituted by a plurality of driven gears installed at the first output shaft and the second output shaft, the driven gear part including
   a first driven gear rotatably connected to the second output shaft and meshed with the first drive gear;
   a second driven gear rotatably connected to the first output shaft and meshed with the first drive gear;
   a third driven gear rotatably connected to the first output shaft and meshed with the second drive gear;
   a fourth driven gear rotatably connected to the first output shaft and meshed with the third drive gear;
   a fifth driven gear connected to the second output shaft and meshed with the third drive gear; and
   a synchronization part configured to connect or disconnect the first output shaft or the second output shaft and the driven gear part to realize multi-stage gear shift steps,
   wherein the clutch part comprises:
   a first clutch installed at the first input shaft and configured to transmit or interrupt the power of the engine; and
   a second clutch installed at the second input shaft and configured to transmit or interrupt the power of the engine.

2. The automated manual transmission according to claim 1, wherein the second output shaft comprises:
   a front output shaft provided with the seventh driven gear; and
   a rear output shaft provided with the first driven gear, the fifth driven gear and the eighth driven gear.

3. The automated manual transmission according to claim 2, wherein the synchronization part comprises:
   a first synchronizer slidably installed at the first output shaft and engaged with or separated from the fourth driven gear or the sixth driven gear;
   a second synchronizer slidably installed at the first output shaft and engaged with or separated from the second driven gear or the third driven gear;
   a third synchronizer slidably installed at the second output shaft, engaged with or separated from the fifth driven gear or the seventh driven gear, and installed at the front output shaft; and
   a fourth synchronizer slidably installed at the second output shaft, engaged with or separated from the first driven gear, engaged with or separated from the eighth driven gear, and installed at the rear output shaft.

4. The automated manual transmission according to claim 3, wherein a first transmission gear meshed with a differential gear is installed at the first output shaft, and a second transmission gear meshed with the differential gear is installed at the front output shaft.

5. The automated manual transmission according to claim 4, wherein the first clutch is operated, the fourth synchronizer is engaged with the first driven gear, and the third synchronizer is engaged with the seventh driven gear to realize a gear shift step of a first forward speed;
   the second clutch is operated, and the third synchronizer is engaged with the seventh driven gear to realize a gear shift step of a second forward speed;
   the first clutch is operated, and the second synchronizer is engaged with the second driven gear to realize a gear shift step of a third forward speed;

the second clutch is operated, and the first synchronizer is engaged with the fourth driven gear to realize a gear shift step of a fourth forward speed;

the first clutch is operated, and the second synchronizer is engaged with the third driven gear to realize a gear shift step of a fifth forward speed;

the second clutch is operated, and the third synchronizer is engaged with the fifth driven gear to realize a gear shift step of a sixth forward speed;

the first clutch is operated, the third synchronizer is engaged with the fifth driven gear, and the fourth synchronizer is connected to the eighth driven gear to realize a gear shift step of a seventh forward speed;

the second clutch is operated, the fourth synchronizer is engaged with the first driven gear, and the second synchronizer is connected to the third driven gear to realize a gear shift step of an eighth forward speed; and the first clutch is operated, the fourth synchronizer is engaged with the first driven gear, and the first synchronizer is engaged with the sixth driven gear to realize a gear shift step of one rearward speed.

* * * * *